United States Patent [19]

Klemann et al.

[11] 4,104,451
[45] Aug. 1, 1978

[54] ALKALI METAL ANODE/CHALCOGENIDE CATHODE REVERSIBLE BATTERIES HAVING ALKALI METAL POLYARYL METALLIC COMPOUND ELECTROLYTES

[75] Inventors: Lawrence P. Klemann, Somerville; Gerald H. Newman, Westfield, both of N.J.

[73] Assignee: Exxon Research & Engineering Co., Linden, N.J.

[21] Appl. No.: 836,314

[22] Filed: Sep. 26, 1977

[51] Int. Cl.$^2$ ............................................. H01M 6/14
[52] U.S. Cl. ................................... 429/194; 429/198; 429/218
[58] Field of Search ................. 429/194, 197, 198, 218

[56] References Cited

U.S. PATENT DOCUMENTS

| | | | |
|---|---|---|---|
| 3,764,385 | 10/1973 | Langer et al. | 429/194 X |
| 4,002,492 | 1/1977 | Rao | 429/194 |
| 4,009,052 | 2/1977 | Whittingham | 429/194 X |

*Primary Examiner*—Charles F. LeFevour
*Attorney, Agent, or Firm*—Kenneth P. Glynn

[57] ABSTRACT

Reversible alkali metal anode/metal chalcogenide cathode cells, e.g. lithium batteries, are described having electrolyte compositions which consist essentially of (a) organic solvents selected from the group consisting of inertly substituted and unsubstituted ethers, esters, sulfones, organic sulfites, organic sulfates, organic nitrites and organic nitro compounds; and (b) electrolytically active alkali metal salts including polyaryl metallic alkali metal salts having the formula $ZMR_n$ wherein Z is an alkali metal, M is a metal selected from the group consisting of Zn, Cd, B, Al, Ga, In, Tl, Sn (stannous), P and As, the Rs are certain aryl radicals, and $n$ is a numerical value equal to one plus the valence of the metal M. Rechargeable, high energy density electrochemical cells containing an anode having an alkali metal as its active material, a cathode having as its active material a transition metal chalcogenide, e.g. $TiS_2$, and an electrolyte composition of the above-described type, are preferred.

19 Claims, No Drawings

ALKALI METAL ANODE/CHALCOGENIDE CATHODE REVERSIBLE BATTERIES HAVING ALKALI METAL POLYARYL METALLIC COMPOUND ELECTROLYTES

BACKGROUND OF THE INVENTION (1) Field of the Invention

The present invention relates to novel electrochemical cells having electrolyte compositions containing specified compounds. More specifically, the present invention is directed to rechargeable, high energy density electrochemical cells having alkali metal anodes, chalcogenide cathodes and containing electrolyte compositions consisting essentially of solvent and electrolytically active alkali metal salts including a polyaryl metallic alkali metal salt.

(2) Prior Art

A recently developed rechargeable, high energy density electrochemical cell consists of an alkali metal material as the anode-active material, a transition metal chalcogenide as the cathode-active material, and a nonaqueous electrolyte. More specifically, preferred cells consist of lithium anodes, titanium disulfide cathodes and nonaqueous electrolyte compositions consisting of various lithium salts, such as $LiClO_4$, dissolved in organic solvents, such as propylene carbonate, tetrahydrofuran, dioxolane, and mixtures of dimethyoxyethane and tetrahydrofuran, and containing various stabilizing additives.

Important features of these cells include their ability to be repeatedly discharged and charged. Theoretically, cycling by discharging and charging should be possible indefinitely, but in practice indefinite cycling is not realized. Dendritic growth on the anode during charging and degradation of the cathode material are sometimes limiting factors in the amount of cycling to which a cell can be subjected. However, the electrolyte, particularly nonaqueous electrolytes, can at times be the limiting factor. The effects of a particular electrolyte composition on the electrochemical performance of a cell may be significant due to its relative stability or it may be due to other factors. One particular electrolyte composition might be highly effective with a given anode-cathode couple but be ineffective for another couple, either because it is not inert to the second couple or because it reacts with itself under the conditions present during cycling. Furthermore, even when a particular electrolyte composition is effective in a given cell, it may nontheless be undesirable for other reasons. For example, the sometimes preferred $LiClO_4$ based electrolyte creates a potential explosion hazard. And, for example, various organometallic alkali metal salt compounds such as are described in U.S. Pat. Nos. 3,734,963 and 3,764,385 have the disadvantage of requiring complexing with various nitrogen, phosphorus or sulfur-containing organic compounds containing at least two functionalities.

A study has been made directed to $LiB(C_6H_5)_4$ electrolyte systems by Bhattacharyya, Lee, Smid and Swarc, *J. Phys. Chem.*, Vol. 69, p. 608 et seq. (1965) but no suggestion is made therein that such systems may be used in cells containing alkali metal anodes. Also, the Bhattacharyya et al systems have been found to have low solubility and high resistivity. U.S. Pat. No. 3,935,025 describes anolytes and catholytes for sodium-containing batteries which contain specified alkali metal salts, e.g. $NaB(C_6H_5)_4$, in organic solvents, but the reference fails to suggest the use of such systems having alkali metal anodes in combinAtion with chalcogenide cathodes. Copending U.S. patent application Ser. No. 750,517, now U.S. Pat. No. 4,060,674 entitled "Alkali Metal Anode-Containing Cells Having Electrolytes of Organometallic Alkali Metal Salts and Organic Solvents", filed on Dec. 14, 1976 by the present inventors now U.S. Pat. No. 4,060,674, described various organometallic alkali metal salt electrolytes, e.g. $LiB(CH_3)_4$ and $LiB(C_6H_5)_3CH_3$, and cells containing these, the salts being limited to those wherein at least one organic substituent is an alkyl radical. It has now been unexpectedly discovered that the salts used as electrolytes in the present invention having all aryl radicals as substituents exhibit superior gassing inhibition and have been found to be exceptional electrolytes for alkali metal anode/chalcogenide cathode cells in which gassing would otherwise be a problem. In fact, some of the preferred electrolytes of the above-mentioned copending application appeared to exhibit gassing which is typical of such electrolytes, whereas at least some of the electrolytes used in the present invention surprisingly appear to exhibit substantially negligible gassing.

DETAILED DESCRIPTION OF THE INVENTION

The present invention is directed to improved electrochemical cells having alkali metal anodes and chalcogenide cathodes, and containing specified electrolyte compositions. The electrolyte compositions consist essentially of organic solvent and electrolytically active alkali metal salts including a polyaryl metallic alkali metal salt of the formula:

$$ZMR_n \tag{1}$$

wherein Z is an alkali metal, M is a metal selected from the group consisting of Zn, Cd, B, Al, Ga, In, Tl, Sn (stannous) P and As, R represents aryl radicals, as more specifically set forth below, and n is the number of organic radicals, i.e., n is a numerical value equal to one plus the valence of the metal M.

The alkali metal represented by Z in Formula (1) above is any alkali metal, but is desirably selected from lithium, sodium and potassium, with lithium being the preferred embodiment.

The metal M in Formula (1) is any of zinc, cadmium, boron, aluminum, gallium, indium, thallium, tin (stannous), phosphorus and arsenic. Desirably, M is selected from the group consisting of boron, aluminum, phosphorus and arsenic. Most preferred is boron.

The aryl radicals represented by each R may be the same or different and are inertly substituted or unsubstituted aryl radicals. By "inertly substituted" is meant radicals containing substituents which have no detrimental effect on the electrolytic properties of the electrolyte composition in the context of its effectiveness in electrochemical cells. These aryl radicals R may be, therefore, inertly substituted or unsubstituted aryl and include aralkyl radicals. Also, the compounds used in the present invention include those of the above Formula (1) in which two of the R radicals may be bonded to one another. In general, the compounds may be selected from the group consisting of aryl radicals having 6 to 50 carbon atoms (including aralkyl radicals having 7 to 50 carbon atoms). Desirable aryl radicals are the phenyl tolyl, biphenyl and naphthyl radicals. Preferred are the phenyl radicals. Particularly useful are the salts wherein all of the organic radicals are phenyl radicals.

The variable $n$ in Formula (1) represents the number of organic radicals R and is, therefore, a numerical value equal to one plus the valence of the metal M. Thus, $n = 3$ when M is Zn, Cd, and Sn, $n = 4$ when M is B, Al, Ga, In, and Tl, and $n = 6$ when M is P and As.

Exemplary polyaryl metallic alkali metal compounds which are desirable electrolytes for the electrochemical cells of the present invention include the following:

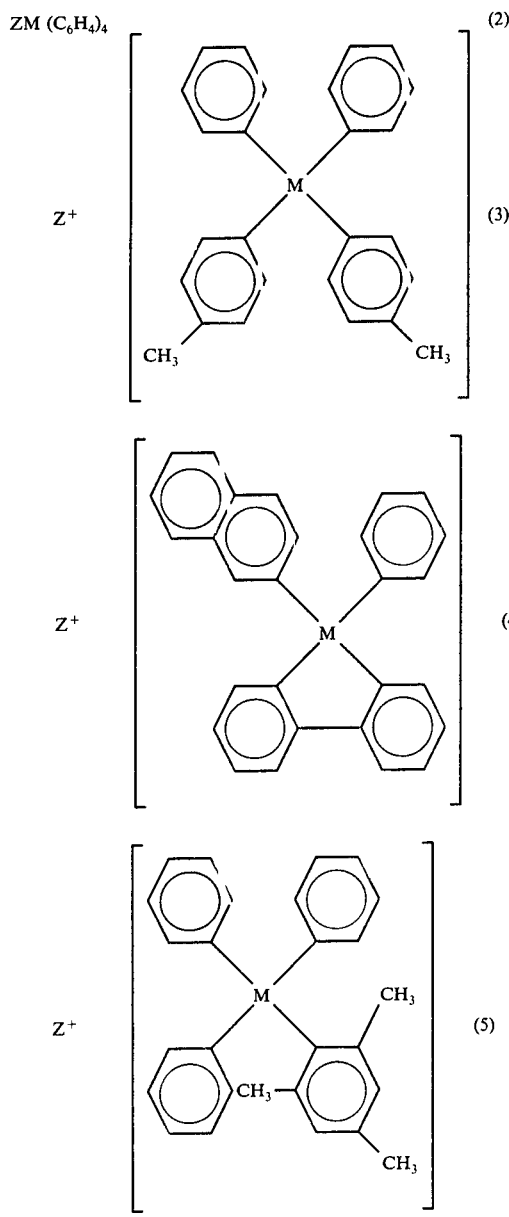

wherein the variables Z and M are as defined above, and especially wherein Z is lithium and M is boron.

The polyaryl metallic alkali metal salts employed in the present invention may be prepared by reacting monoaryl alkali metal compounds with polyaryl-metallic compounds in an organic solvent. This reaction is believed to be represented by the following equation:

wherein the variables are as defined for Formula (1) above. The reaction may be carried over wide ranges of operable pressures and temperatures, and room temperature and pressure conditions will allow the reaction to readily occur in most instances.

As mentioned, the electrolyte composition employed in the cell of the present invention consists essentially of organic solvent and electrolytically active alkali metal salts including a polyaryl metallic alkali metal salt of Formula (1) above. Thus, a mixture of salts is contemplated, at least one of which is a Formula (1) type salt. The other salt or salts in the mixture may be any electrolytically active alkali metal salt which is compatible with the Formula (1) type salt, e.g., LiBr, LiI and the like. Also contemplated is the electrolyte which contains only one or more salts of Formula (1). Thus, the expression "electrolytically active alkali metal salts including a polyaryl metallic alkali metal salt" should be construed to include: (1) mixtures of polyaryl metallic alkali metal salt(s) and other compatible alkali metal salts(s), and (2) one or more polyaryl metallic salts without other salts. Preferred is the electrolyte containing the polyaryl metallic salt(s) without other salts.

The organic solvent employed in the electrolyte composition employed in the cell of the present invention is generally one selected from the group consisting of inertly substituted and unsubstituted ethers, esters, sulfones, organic sulfites, organic sulfates, organic nitrites and organic nitro compounds. By "inertly substituted" solvent is meant one which contains substituents which have no detrimental effect on the electrolytic properties of the electrolyte composition in the context of its effectiveness in electrochemical cells. These solvents may be any of the foregoing which will function as either a diluent or as a complexing solvent with the polyaryl metallic alkali metal salt and which will, with the salt, produce an effective electrolyte. Thus, the solvents which are included are those composed of one or more compounds selected from straight chain ethers, polyethers, and cyclical ethers; including such ethers as the acetals, ketals and orthoesters; and organic esters, sulfones, organic nitro compounds and organic nitrites and organic sulfates and sulfites. Examples include propylene carbonate, tetrahydrofuran, dioxolane, furan, sulfolane, dimethyl sulfite, nitrobenzene, nitro-methane and the like. The preferred solvents are the ethers. For example, dioxolane, dimethoxyethane, and mixtures of these are useful. Preferred is a solvent containing dioxolane.

In general, sufficient organic solvent must be utilized to effectively render the polyaryl metallic alkali metal salt electrolytically active (i.e., adequately conductive) when employed in an electrolytic cell. The solvent may be a mixture of compounds as suggested above, and may contain known electrolyte additives which are compatible with the solvent and the particular salt employed. As to the amount of salt to be employed in the organic solvent, this will vary tremendously with the specific solvent used, the salt chosen and the type of electrochemical cell performance which is desired. In any event, an electrolytically active amount of salt must be added to the solvent. Typically, at least about 0.1 moles of salt up to saturation may be used per liter of solvent, e.g., about 0.1 to about 5 moles/liter may be used and preferably about 0.5 to about 3 moles/liter may be used.

The present invention relates, in general, to improved high energy density electrochemical cells having alkali metal anodes, metal chalcogenide cathodes and electrolyte compositions as described above. Thus, these cells include those containing as anode-active materials any one or more of the alkali metals, and alloys thereof. Alkali metals desirably used in the anodes are lithium, sodium and potassium, and alloys thereof. Of these, lithium and lithium alloys are preferred.

The present invention contemplates any cell having an alkali metal anode, a metal chalcogenide cathode and an electrolyte as defined above. The cathode-active material may be any metal chalcogenide which is cathodically active in alkali metal anode cells. Among these, preferred are the transition metal chalcogenide cathode-active materials, including those containing at least one member selected from the group consisting of molybdenum, titanium, zironium, hafnium, niobium, tantalum and vanadium, and at least one chalcogen selected from oxygen, sulfur, selenium, and tellurium. Of the chalcogenides mentioned, most advantageous are the sulfides. Of the transition metal chalcogenides, preferred are the dichalcogenides, and the most preferred is titanium disulfide.

The following examples are presented as merely being illustrative of the present invention, and the invention should not be construed to be limited thereto.

EXAMPLE 1

$LiB(C_6H_5)_4 \cdot (dioxolane)_{3.3}$

To a 350 ml. flask filled with an $N_2$ inlet and containing a magnetic stirrer bar is charged 34.22 g (0.1 mole) of $NaB(C_6H_5)_4$ and 75 ml of dry dioxolane. With stirring, 16.96 g (0.4 mole) of lithium chloride in 75 ml of dioxolane is added and this mixture is maintained at 50°–60° C. for about 2 hours then at room temperature overnight. The solids are removed by centrifugation and the clear supernatant solution is evaporated to give 55.6 g of white solid. This is dissolved, under an atmosphere of dry $N_2$, in the minimum amount of warm ethylenedichloride, then an equal volume of heptane is added to precipitate the salt. The latter is collected by filtration to afford 46.3 g of recrystallized salt. A 0.352 g sample of this material, dissolved in 0.328 g of dimethoxyethane, is used to obtain a proton nmr spectrum. The spectrum shows multiplets at 7.54 and 7.15 ppm for the $B(C_6H_5)_4{}^-$ anion (20 H) and singlets at 4.90 and 3.78 for dioxolane (20 H) to establish a composition $LiB(C_6H_5)_4 \cdot (dioxolane)_{3.3}$ for the salt.

Elemental analysis: Calc. for $LiB(C_6H_5)_4 \cdot (C_3H_6O_2)_{3.3}$: C 71.35%, H 7.03%, Li 1.22%. Found: C 71.26%, H 6.90%, Li 1.22%, Na<0.005%, Cl 0.21%.

A saturated solution of $LiB(C_6H_5)_4$ is prepared in dioxolane. Nmr analysis of this solution shows the salt concentration to be 0.97 moles/liter dioxolane. Dilutions are made from this stock solution and A.C. resistivities are measured as a function of solute concentration: molality (ohm cm): 0.78(225), 0.52(255), 0.36(329), and 0.27(408).

EXAMPLE 2

By the method of Example 1, the composition $LiB(C_6H_5)_4 (Tetrahydrofuran)_{3.6}$ is prepared in THF solvent. A sample of 1.099 g of this material is dissolved in 0.311 g of dimethoxyethane and 3.65 g of dioxolane. This solution, containing about 1.8 mole $LiB(C_6H_5)_4$ in 4.3 ml of solvent whose composition is 79% dioxolane, 13% tetrahydrofuran, and 8% dimethoxyethane based on volume, shows a specific resistivity of 265 ohm cm.

EXAMPLES 3 TO 6

Gassing tests are performed as follows:

A weighed quantity of $TiS_2$ is placed in a vial along with an aliquot of the electrolyte solution to be tested. A glass U-tube having an extended bulbous section on one side contains mercury to a predetermined level in the bulbous section so as to fill the non-bulbous section to the brim. The vial containing the $TiS_2$ and the electrolyte solution is placed inside the bulbous section of the U-tube above the mercury. A greased cap is placed over the bulbous section to enclose the vial. The entire apparatus is then placed in a constant temperature oven at about 34° C. The amount of gas generated is measured by collecting the mercury overflowing from the U-tube (which is displaced by the gas produced) and weighing the collected mercury.

Examples 3 to 5 involve the testing of copending application Ser. No. 750,517 (cited above) electrolytes and Example 6 involves the testing of an electrolyte of the present invention.

EXAMPLE 3

About 10 cc of a 2.5 m $LiB(CH_3)_4$-DME (glyme) solution in dioxolane is placed in the test vial in contact with 3.0 grams of $TiS_2$ and evolved gas is measured in the above described apparatus and analyzed.

EXAMPLE 4

About 10 cc of a 2.5 m $LiB(CH_3)_4$-diglyme solution in dioxolane is placed in the test vial with about 3.0 grams of $TiS_2$ and tested as in Example 3.

EXAMPLE 5

About 10 cc of a 2.5 m solution of $LiB(CH_3)_4$-triglyme in dioxolane is placed in the test vial with 3.0 grams of $TiS_2$ and tested as in Example 3.

EXAMPLE 6

About 15 cc of a 1.6 m solution of $LiB(C_6H_5)_4$ in a 70:30 mixture of dioxolane: DME (glyme) is placed in the test vial with about 1.5 grams of $TiS_2$ and tested as in Example 3.

The test results for Examples 3 to 6 are shown in Table I below. Most significant is the fact that the Example 6 solution shows no gassing after 6 weeks of testing.

TABLE I

| | GAS EVALUATION TESTS AT 34° C | | |
|---|---|---|---|
| Ex. | | Gassing Rate | Gas Analysis |
| 3 | U.S. Pat. No. 4,060,674 | 1.9 cc/hr/g $TiS_2$ | Ethane, methane, and $B(CH_3)_3$ |
| 4 | U.S. Pat. No. 4,060,674 | 0.13 cc/hr/g $TiS_2$ | Ethane, methane, and $B(CH_3)_3$ |
| 5 | U.S. Pat. No. 4,060,674 | 0.087 cc/hr/g $TiS_2$ | Ethane, methane, and $B(CH_3)_3$ |
| 6 | U.S. Pat. No. 4,060,674 | 0.000 cc/hr/g $TiS^2$ | No gases found |

EXAMPLES 7 TO 9

Additional gassing tests are performed using two copending application electrolytes, $LiB(C_6H_4-O-CH_3)_3CH_3$ and $LiB(C_6H_5)_3CH_3$, for Examples 7 and 8, respectively, and present invention electrolyte LiB($C_6H_5$)$_4$ for Example 9. The Example 7 and 8 systems are tested with 10 cc of electrolyte at 2.0 molality in dioxolane, with 0.75 grams of TiS$_2$ cathode and the Example 9 system is tested with 15 cc of 1.6 molality in dioxolane, with 1.5 grams of TiS$_2$ cathode material, in accordance with the procedure outlined above for Examples 3 to 6.

For the first eight hours of testing, significant gassing is observed with the test cells of Examples 7 and 8, followed by no gassing thereafter. During the entire period of testing, no gassing whatsoever is observed with the present invention test cell of Example 9.

EXAMPLE 10

A number of test cells are prepared with a lithium anode, a TiS$_2$ cathode and a lithium tetraphenyl boride-dioxolane solution electrolyte. To illustrate performance, one cell having a 1.6 m LiB($C_6H_5$)$_4$-70:30, dioxolane:DME electrolyte with a cathode loading to 13.8 mg-hrs/cm$^3$ has a primary discharge of 94% MU and a discharge rate of 0.34 ma/cm$^2$ over 26 cycles.

What is claimed is:

1. In an electrochemical cell which contains an alkali metal anode, a metal chalcogenide cathode and a nonaqueous electrolyte, the improvement comprising:
   using as said electrolyte one which consists essentially of:
   (a) an organic solvent selected from the group consisting of inertly substituted and unsubstituted ethers, sulfones, organic sulfates, organic sulfites, organic nitro compounds and organic nitrites; and,
   (b) electrolytically active alkali metal salts including an electrolytically active amount of a polyaryl metallic alkali metal salt having the formula:

ZMR$_n$ wherein Z is an alkali metal, wherein M is a metal selected from the group consisting of Zn, Cd, B, Al, Ga, Sn (stannous), In, Tl, P and As, wherein R represents $n$ number of radicals which may be the same or different and are inertly substituted or unsubstituted aryl radicals selected from the group consisting of aryl radicals having 6 to 50 carbon atoms, and wherein $n$ is a numerical value equal to one plus the valence of the metal M.

2. The cell of claim 1 wherein in the electrolyte, Z is an alkali metal selected from the group consisting of lithium, sodium, and potassium, M is a metal selected from the group consisting of B, Al, P and As, and wherein the aryl radicals R may be the same or different and are inertly substituted or unsubstituted aryl radicals selected from the group consisting of phenyl, tolyl, biphenyl, and naphthyl radicals.

3. The cell of claim 2 wherein the cell is a secondary cell and the organic solvent is an ether.

4. The cell of claim 3 wherein, in the electrolyte, Z is lithium and wherein M is boron.

5. The cell of claim 4 wherein said organic solvent is one or more ethers and wherein all of the aryl radicals R are phenyl radicals.

6. The cell of claim 1 wherein the cathode comprises a solid metal dichalcogenide.

7. The cell of claim 6 wherein in the electrolyte, Z is an alkali metal selected from the group consisting of lithium, sodium, and potassium, M is a metal selected from the group consisting of B, Al, P and As, and wherein the aryl radicals R may be the same or different and are inertly substituted or unsubstituted aryl radicals selected from the group consisting of phenyl, tolyl, biphenyl, and naphthyl radicals.

8. The cell of claim 7 wherein the cell is a secondary cell and the organic solvent is an ether.

9. The cell of claim 8 wherein, in the electrolyte, Z is lithium and wherein M is boron.

10. The cell of claim 9 wherein said organic solvent is one or more ethers and wherein all of the aryl radicals R are phenyl radicals.

11. In an electrochemical cell which includes an anode having at least one alkali metal as its active material, a cathode having a transition metal chalcogenide as the cathode-active material and an electrolyte composition, the improvement wherein said electrolyte composition consists essentially of:
    (a) an organic solvent selected from the group consisting of inertly substituted and unsubstituted ethers, sulfones, organic sulfates, organic sulfites, organic nitro compounds and organic nitrites; and
    (b) electrolytically active alkali metal salts including an electrolytically active amount of a polyaryl metallic alkali metal salt having the formula:

ZMR$_n$ wherein Z is an alkali metal, wherein M is a metal selected from the group consisting of Zn, Cd, B, Al, Ga, Sn (stannous), In, Tl, P and As, wherein R represents $n$ number of radicals which may be the same or different and are inertly substituted or unsubstituted aryl radicals selected from the group consisting of aryl radicals having 6 to 50 carbon atoms, and wherein $n$ is a numerical value equal to one plus the valence of the metal M.

12. The electrochemical cell of claim 11 wherein, in the electrolyte, Z is an alkali metal selected from the group consisting of lithium, sodium, and potassium, M is a metal selected from the group consisting of B, Al, P and As, and wherein the aryl radicals R may be the same or different and are inertly substituted or unsubstituted aryl radicals selected from the group consisting of phenyl, tolyl, biphenyl and naphthyl radicals.

13. The electrochemical cell of claim 12 wherein the anode-active material is lithium or alloys thereof, wherein the cathode-active material is titanium disulfide, and wherein, in the electrolyte, Z is lithium.

14. The electrochemical cell of claim 13 wherein said organic solvent is one or more ethers.

15. The electrochemical cell of claim 13 wherein, in the electrolyte, Z is lithium, wherein M is boron.

16. The electrochemical cell of claim 15 wherein said organic solvent is one or more ethers and wherein all of the aryl radicals R are all phenyl radicals.

17. The electrochemical cell of claim 16 wherein the solvent contains dioxolane.

18. The electrochemical cell of claim 17 wherein the concentration of the organometallic alkali metal salt in said solvent is about 0.1 to about 5 moles/liter.

19. The electrochemical cell of claim 18 wherein the concentration of the organometallic alkali metal salt in said solvent is about 0.5 to About 3 moles/liter.

* * * * *